(12) United States Patent
Liebmann et al.

(10) Patent No.: US 10,415,629 B2
(45) Date of Patent: Sep. 17, 2019

(54) CRANKSHAFT FOR A RECIPROCATING PISTON ENGINE

(71) Applicant: Daimler AG, Stuttgart (DE)

(72) Inventors: Frank Liebmann, Malsch (DE); Heiko Breuning, Ostfildern (DE); Christian Harms, Stuttgart (DE); Ulrich Holtmann, Ludwigsburg (DE); Uli Wiedenmann, Notzingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/900,810

(22) PCT Filed: May 27, 2014

(86) PCT No.: PCT/EP2014/001423
§ 371 (c)(1),
(2) Date: Dec. 22, 2015

(87) PCT Pub. No.: WO2014/206519
PCT Pub. Date: Dec. 31, 2014

(65) Prior Publication Data
US 2016/0138645 A1    May 19, 2016

(30) Foreign Application Priority Data
Jun. 27, 2013 (DE) .......................... 10 2013 010 747

(51) Int. Cl.
*F16C 3/06* (2006.01)
*F16C 3/08* (2006.01)

(52) U.S. Cl.
CPC . *F16C 3/06* (2013.01); *F16C 3/08* (2013.01)

(58) Field of Classification Search
CPC ..................................... F16C 3/06; F16C 3/08
See application file for complete search history.

(56) References Cited

U.S. PATENT DOCUMENTS 2,378,686 A * 6/1945 Carstens ................. B21K 1/08
29/888.08
4,015,485 A    4/1977 Ganter-Ullmann et al.

FOREIGN PATENT DOCUMENTS

| CN | 201258906 Y | 6/2009 | |
|---|---|---|---|
| DE | 714558 C * | 12/1941 | ............... F16C 3/08 |
| DE | 24 35 476 A1 | 2/1976 | |
| DE | 102006043617 A1 * | 3/2008 | ............... F16C 3/06 |
| DE | 10 2008 046 821 A1 | 4/2010 | |
| DE | 10 2011 014 310 A1 | 9/2012 | |
| DE | 10 2011 104 400 A1 | 12/2012 | |
| GB | 1 345 769 A | 2/1974 | |

(Continued)

OTHER PUBLICATIONS

Translation DE 714558.*

(Continued)

*Primary Examiner* — Vicky A Johnson
(74) *Attorney, Agent, or Firm* — Crowell & Moring LLP

(57) ABSTRACT

A crankshaft for a reciprocating piston engine is disclosed. The crankshaft has at least two shaft journals adjoined by respective crank webs which are connected to one another by an associated crank pin. Respective material accumulations, which in each case have a surface oriented at least substantially orthogonally with respect to the axis of rotation, are provided on the crank webs in the region of the axis of rotation.

3 Claims, 5 Drawing Sheets

(56) References Cited

FOREIGN PATENT DOCUMENTS

| | | |
|---|---|---|
| JP | 55-37276 A | 3/1980 |
| JP | 2-53511 U | 4/1990 |
| JP | 2000-320531 A | 11/2000 |
| JP | 2001-082443 A | 3/2001 |
| JP | 2009-133331 A | 6/2009 |

OTHER PUBLICATIONS

PCT/EP2014/001423, International Search Report (PCT/ISA/210) dated Jul. 25, 2014 (Three (3) pages).

Chinese Office Action issued in Chinese counterpart application No. 201480024278.0 dated Feb. 4, 2017, with partial English translation (Nine (9) pages).

Japanese Office Action issued in Japanese counterpart application No. 2016-520301 dated Dec. 13, 2016, with partial English translation (Six (6) pages).

* cited by examiner

CRANKSHAFT FOR A RECIPROCATING PISTON ENGINE

BACKGROUND AND SUMMARY OF THE INVENTION

The invention relates to a crankshaft for a reciprocating piston engine.

It is known from the prior art that crankshafts of reciprocating piston engines are exposed to high torsional moments, and also to many load changes and consequently must have a particularly high resistance to load changes. The conventional methods for production of crankshafts include both forging and also casting processes, wherein first of all the particular crankshaft is produced in its rough state and subsequently the crankshaft undergoes the appropriate final processing steps to meet the respective requirements. These final processing steps include for example balancing of the crankshaft for elimination of rotational irregularities, or the surface processing of respective journals which correspond to respective bearings of the engine or respective big end bearings. In addition to the surface processing of corresponding bearing points of the crankshaft, the final processing also includes the reduction of stress peaks, such as are produced as a consequence of bending or torsional stress on the crankshaft.

It is known from DE 24 35 476 A1 that barrel-shaped hollow bores in the corresponding crank pins of the crankshaft lead to a more favorable stress distribution in the crankshaft. Consequently, the stress peaks are reduced and the stress distribution in the crankshaft takes place in a more uniform manner.

From JP 2000 320531 A a crankshaft of an internal combustion engine is known which comprises an accumulation of material on the ground pin side facing away from a crank arm in the rotation axis. This accumulation of material is used to improve the stiffness of the crankshaft combined with low weight gain. The crankshaft shown has no through hole.

From JP S55 37276 A a crankshaft is known, which has an accumulation of material on a crank arm for reasons of machining of the groove and an axial thrust surface.

In this connection it is usual for at least most of the crank pins, which are also designated as shaft journals, to have a bore drilled through them along the axis of rotation of the crankshaft in order to achieve the most uniform stress distribution possible along the entire crankshaft. Furthermore, it is known that the length of the crankshaft increases with the number of cylinders of the reciprocating piston engine. In order to ensure that the bores in the respective shaft journal of the crankshaft are particularly accurately aligned with one another, it is necessary to produce these bores in the context of one individual working step. Thus, in other words, the drilling tool is set on an end of the crankshaft on the longitudinal axis which corresponds to the axis of rotation of the crankshaft, and the shaft journals of the crankshaft have a bore drilled through them along this axis of rotation in one working step. However, this working step is subject to a particularly difficult process management, as a particularly long drilling tool which produces the corresponding bores in the shaft journals particularly centrally and accordingly with a particularly small axial offset with respect to one another is necessary for the drilling of the bore through the crankshaft in the context of an individual working step.

The object of the present invention is to create a crankshaft for a reciprocating piston engine in which the corresponding shaft journals have bores aligned particularly accurately with one another.

In order to create a crankshaft of the type referred to above which has bores aligned particularly accurately with one another in the respective shaft journals in the form of a through bore relating to the respective shaft journal, according to the invention it is provided that respective material accumulations, which in each case have a surface oriented at least substantially orthogonally with respect to the axis of rotation, are provided on the crank webs in the region of an axis of rotation. Consequently, according to the invention, it is provided that, by means of these material accumulations, respective surfaces on the crank webs of the crankshaft, on which the drill enters or exits the material of the crankshaft in a perpendicular manner, are created for the drilling tool. As a result, the lateral forces on the drilling tool are reduced to a minimum when the tool penetrates into the material of the crankshaft or exits from the material of the crankshaft. Thus, it is ensured that the drilling tool does not impinge on an oblique surface which can lead to drifting of the drilling tool and consequently to a bore with less precision. In this connection it is particularly advantageous if the crankshaft already has these material accumulations in its rough state, that is to say before any final processing steps such as for example the surface processing of the respective shaft journals or crank pins has been carried out. Consequently, it is particularly favorable if already at the time of production of the crankshaft, that is to say for example at the time of forging or casting the crankshaft, these material accumulations are attached to the crankshaft, that is to say they are produced in one piece with the crankshaft.

Thus, due to the material accumulations, no guide means such as for example sleeves for guiding the drill between the individual drill entries and exits are necessary. Thus, in other words, the guiding of the drilling tool is performed merely by the crankshaft itself through which the bore is to be drilled. By the prevention of transverse forces and sliding of the drill during the drilling operation, such as would be the case in the event of the drill tip striking an oblique surface, on the one hand the through bore is produced particularly precisely and, on the other hand, the service life of the drilling tool is significantly increased.

Further advantages, features and details of the invention can be seen from the following description of a preferred exemplary embodiment and with reference to the drawings.

DETAILED DESCRIPTION OF THE DRAWINGS

Figure 1:
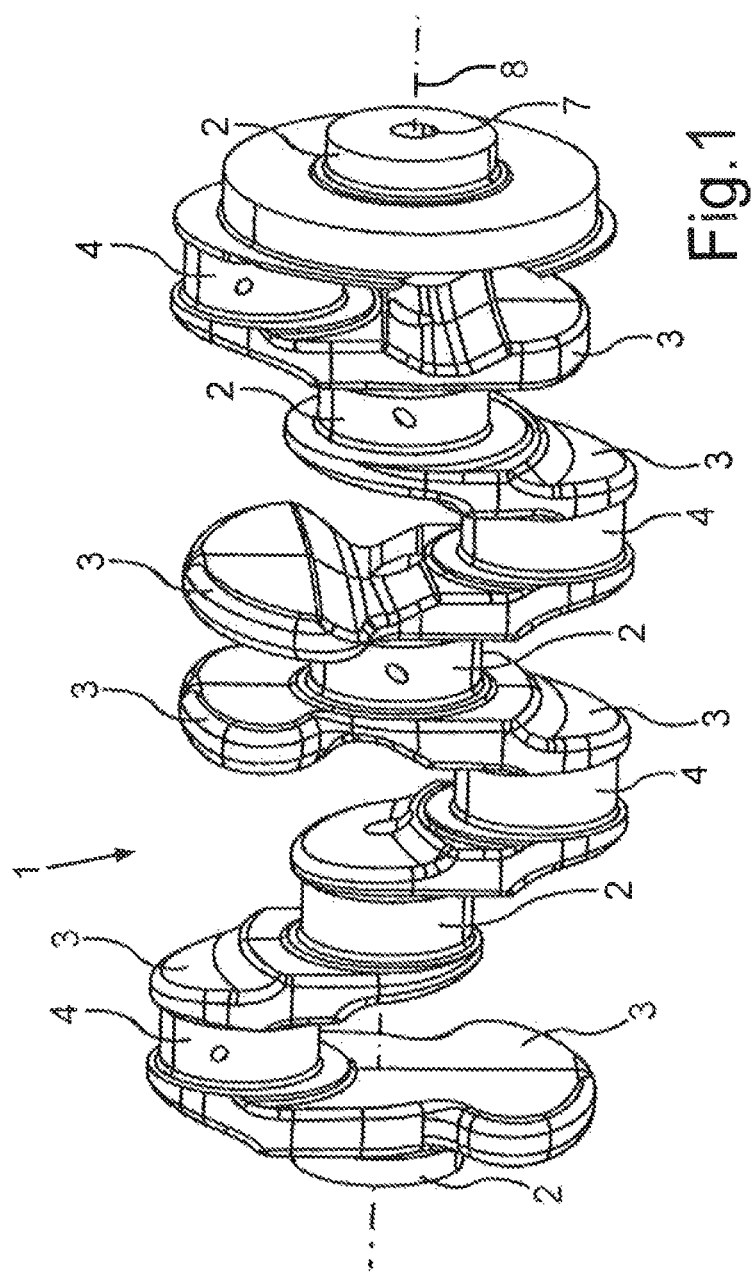
FIG. 1 shows a schematic perspective view of a crankshaft which according to the prior art has a through bore along an axis of rotation of the crankshaft.

A crankshaft 1 known from the prior art is illustrated in a schematic perspective view in FIG. 1. Thus, it is known that the crankshaft 1 is mounted by means of respective shaft journals 2 in crankshaft bearings (not shown) of a reciprocating piston engine. The crankshaft 1 rotates predominantly about an axis of rotation 8 which at the same time corresponds to a center line of a through bore 7 of the crankshaft 1. While the shaft journals 2 merely rotate in their respective bearings about the axis of rotation 8 and thus about their respective longitudinal axis, respective crank pins 4, which are connected by means of respective crank webs 3 to the shaft journals 2, predominantly describe a circular path about the axis of rotation 8. The crank pins 4 are surrounded by respective big end bearings of connecting rods (not shown here), wherein the number of crank pins 4 corresponds to the number of cylinders of the reciprocating piston engine.

Figure 2:
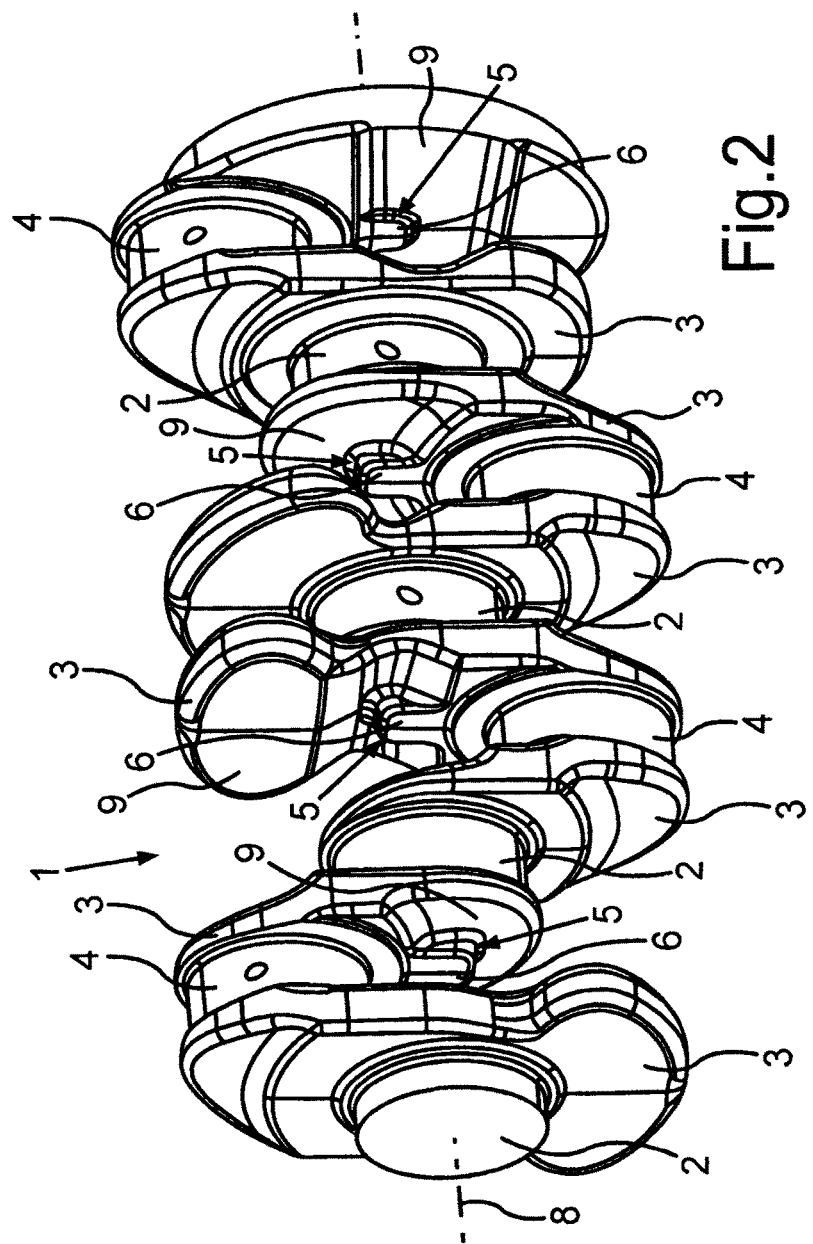
FIG. 2 shows a schematic perspective view of the crankshaft according to the invention which has along its axis of rotation respective material accumulations with surfaces oriented orthogonally with respect to the axis of rotation.
Figure 3:
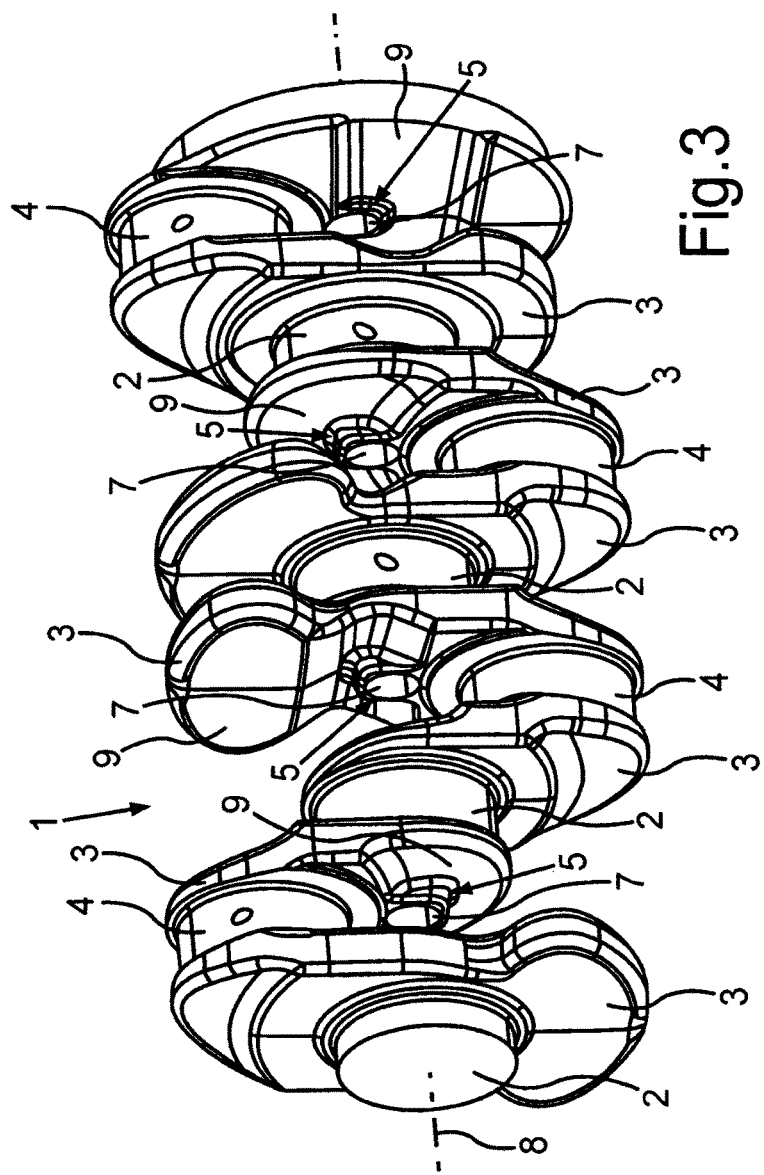
FIG. 3 shows a schematic perspective view of the crankshaft, wherein in this case most of the shaft journals of the crankshaft have the material accumulations which in the present case have bores drilled through them along the axis of rotation.
Figure 4:
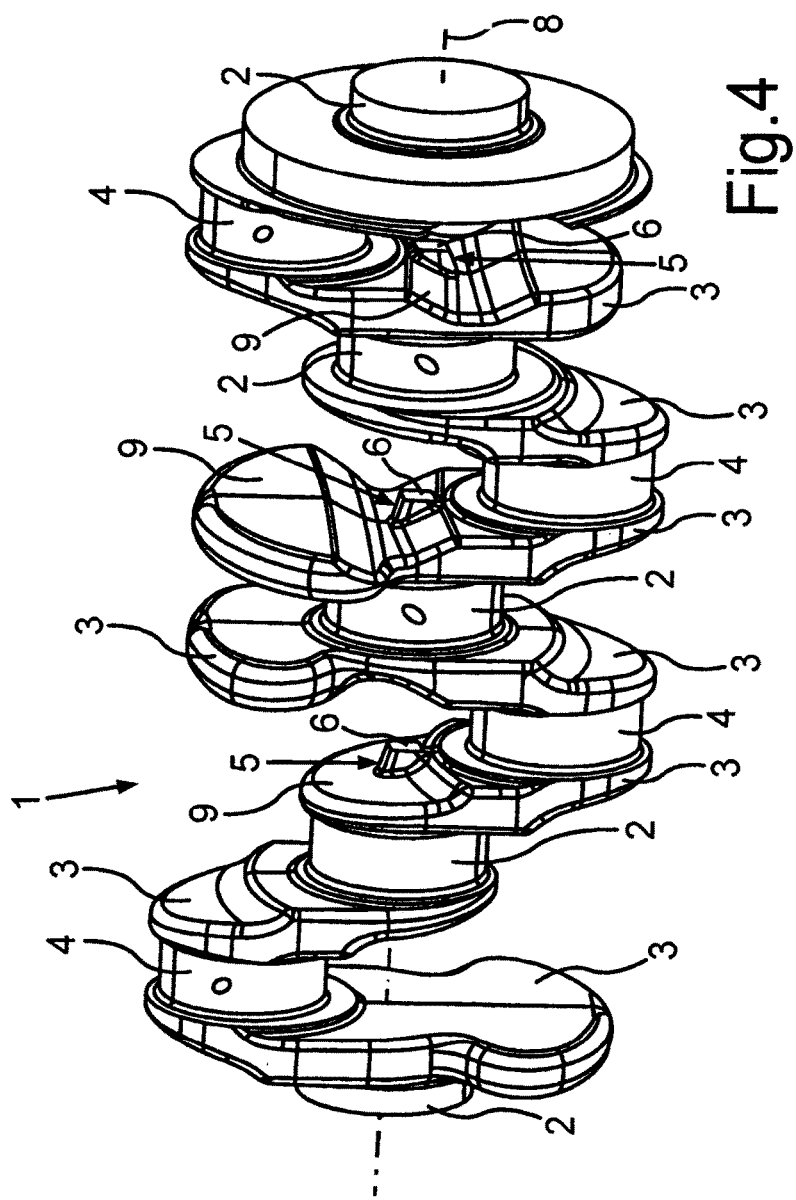
FIG. 4 shows a schematic perspective view of the crankshaft which has the accumulations of material in the region of the axis of rotation.
Figure 5:
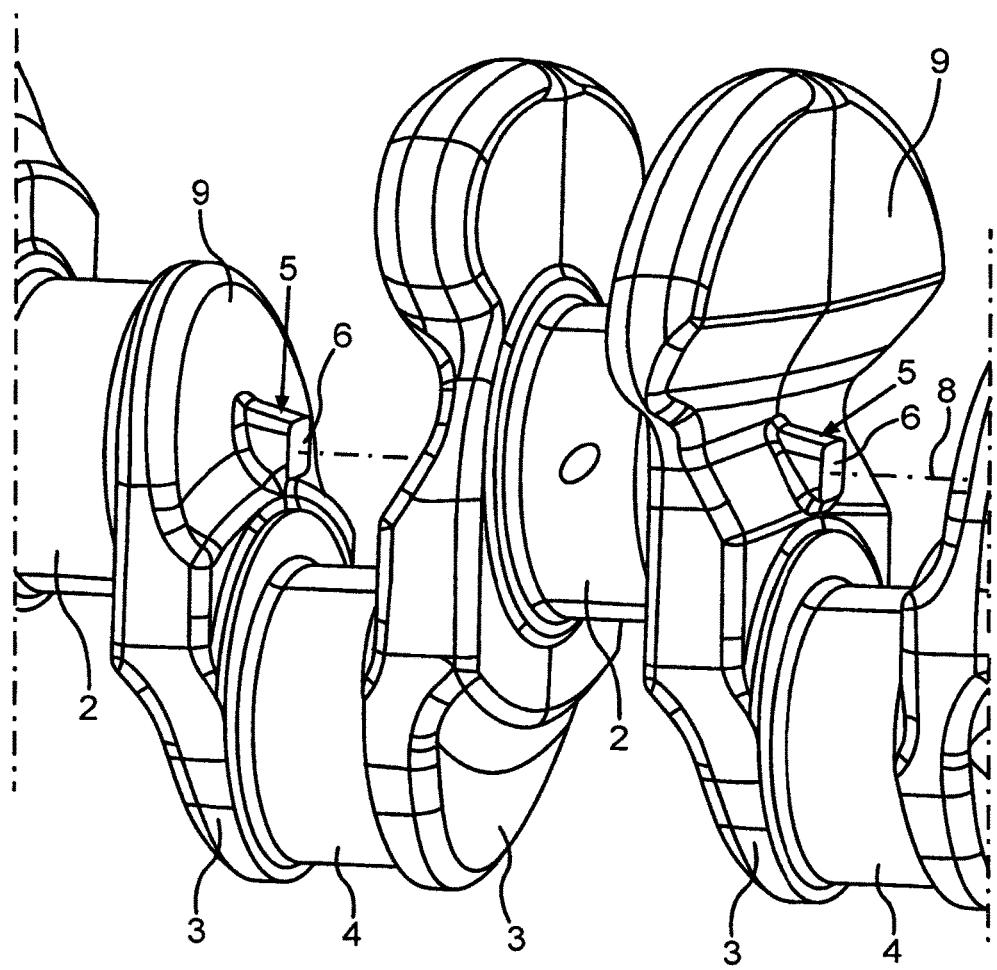
FIG. 5 shows a schematic detail of the crankshaft illustrated in FIG. 4.

In contrast to FIG. 1, the crankshaft 1 is illustrated in its rough state in the schematic perspective view in FIG. 2. Since the structure of the crankshaft 1 has already been described in essential parts with reference to FIG. 1, in the following drawings (FIG. 2 to FIG. 5) only the differences are discussed. In contrast to FIG. 1, in FIG. 2 as well as in combination with the schematic perspective view of the crankshaft 1 with reference to FIG. 4, it can be seen that the crankshaft 1 according to the invention has material accumulations 5 by means of which a bore can be drilled through the crankshaft 1 along the axis of rotation 8 in a particularly reliable process, without the risk of the through bore 7 produced thereby deviating from the axis of rotation 8 for example as a result of drifting of the drilling tool. Furthermore, from the combined consideration of FIG. 2 and FIG. 4 it can be seen that the material accumulations 5 are disposed on a respective side, which faces away from the associated shaft journal 2 and corresponds to an accumulation side 9, of the respective crank web 3. In this case it is provided that the material accumulations 5 in each case have surfaces 6 oriented at least substantially orthogonally with respect to the axis of rotation 8. In order to particularly effectively prevent drifting of the drilling tool during drilling of the bore through the crankshaft 1 along the axis of rotation 8 and accordingly to minimize any transverse forces acting on the drilling tool, the surfaces 6 are disposed substantially in axial alignment with one another according to the extent of the axis of rotation 8. In this case the extent of the respective surface 6 can preferably be provided as a rectangular or also a round external contour, wherein, however, an asymmetrical external contour can be provided. In order now to expose the drilling tool to particularly low transverse forces, the extent of the surface 6 orthogonally with respect to the axis of rotation 8 is dimensioned in such a way that the projected range of the drilling tool is located completely on the surface 6. This can be seen in particular when considered together with the schematic perspective view of the crankshaft 1 with reference to FIG. 3. Thus, in other words, the borehole surface of the through bore 7, which results predominantly from the diameter of the drilling tool, is located at least predominantly on the surfaces 6 of the respective material accumulations 5, wherein even after the drilling of the bore in the circumferential direction around the through bore 7 a substantially annular residual surface 6 remains. Thus, in other words, it is ensured that during the entire drilling operation the drilling tool strikes the surface 6 oriented orthogonally with respect to the drilling tool. Furthermore, as can be seen from the combined consideration of FIG. 2, FIG. 4 and FIG. 5, which shows a schematic detail of the crankshaft illustrated in FIG. 4, the material accumulations 5 are not only plateau-shaped but are also disposed on respective accumulation sides 9 of the respective crank webs 3. Thus, the respective accumulation side 9 corresponds to the side of the respective crank web 3 facing away from the associated shaft journal 2.

Thus, due to the formation according to the invention of the respective surfaces 6 of the material accumulations 5 on the respective accumulation sides 9 of the respective crank webs 3, for the drilling tool a flat level stop is provided, by means of which it is ensured that the effects of transverse forces on the drilling tool are avoided. Furthermore, if the surface 6 is configured so that during the entire drilling operation the drilling tool strikes the material of the crankshaft substantially orthogonally over the entire extent thereof, any burrs remaining due to the drilling operation are minimized, and pointed, sharp contours after the drilling are avoided. Furthermore, the surface 6 can be both connected as a rough contour to the crankshaft 1, that is to say produced together with the semifinished crankshaft and designed as a plateau, and also can be processed at a later stage and consequently oriented orthogonally with respect to the axis of rotation 8.

The invention claimed is:

1. A crankshaft for a reciprocating piston engine, comprising:
    at least two shaft journals adjoined by respective crank webs which are connected to one another by a crank pin, wherein each of the at least two shaft journals has a through bore disposed concentrically with respect to an axis of rotation;
    wherein respective material accumulations are positioned on and protruding from the crank webs in a region of the axis of rotation of the crankshaft, wherein the material accumulations each have a surface facing outwardly from the adjoined shaft journal oriented orthogonally with respect to the axis of rotation of the crankshaft, wherein the surfaces are disposed substantially axially in alignment with one another corresponding to an extent of the axis of rotation, and wherein the through bore extends through the surfaces along the axis of rotation.

2. The crankshaft according to claim 1, wherein the material accumulations are plateau-shaped.

3. The crankshaft according to claim 1, wherein the material accumulations are disposed on a side of the respective crank web that faces away from the adjoined shaft journal.

* * * * *